United States Patent [19]
Stone

[11] 3,746,981

[45] July 17, 1973

[54] ELECTRICAL FAULT MONITORING WITH MEMORY

[75] Inventor: James S. Stone, Cedar Rapids, Iowa

[73] Assignee: Collins Radio Company, Dallas, Tex.

[22] Filed: Sept. 24, 1971

[21] Appl. No.: 183,387

[52] U.S. Cl.................. 324/73 R, 324/51, 324/133
[51] Int. Cl....................... G01r 15/12, G01r 31/02
[58] Field of Search.................... 324/73 R, 51, 133; 340/256

[56] References Cited
UNITED STATES PATENTS
2,970,260  1/1961  Flint.................................. 324/73
3,235,861  2/1966  Krog-Jensen ......................... 324/73
3,495,172  2/1970  Davis.................................. 324/51

Primary Examiner—Rudolph V. Rolinec
Assistant Examiner—Ernest F. Karlsen
Attorney—Henry K. Woodard and Robert J. Crawford

[57] ABSTRACT

Means for monitoring electronic equipment and detecting faults including memory means whereby transient or intermittent faults may be identified and corrected after an interval of time.

6 Claims, 3 Drawing Figures

ELECTRICAL FAULT MONITORING WITH MEMORY

This invention relates generally to monitoring means for electrical circuitry, and more particularly to sensing and monitoring circuitry with memory capability.

To facilitate maintenance and troubleshooting of complex electrical systems, provision is usually made for test points in critical areas of the equipment for monitoring of voltages. In digital electronic equipment the monitored voltages may be merely desired dc voltage levels.

The present invention is directed to means for monitoring a plurality of voltages within electrical circuitry and actuating alarm means responsive to a sensed fault in one or more of the monitored voltages. Additionally, memory means is provided to register the indicated fault so that remedial action may be taken at some later time. This latter feature is particularly desirable in detecting and correcting an intermittent fault.

Accordingly, an object of the invention is an improved sensing and monitoring means for detecting faults in electronic equipment.

Another object of the invention is sensing and monitoring means with memory capability.

Still another object of the invention is fault sensing and monitoring means utilizing a minimum of components and easily expandable to cover any desired number of fault sensors.

These and other objects and features of the invention will be readily apparent from the following detailed description and appended claims when taken with the drawings, in which:

Figure 1:
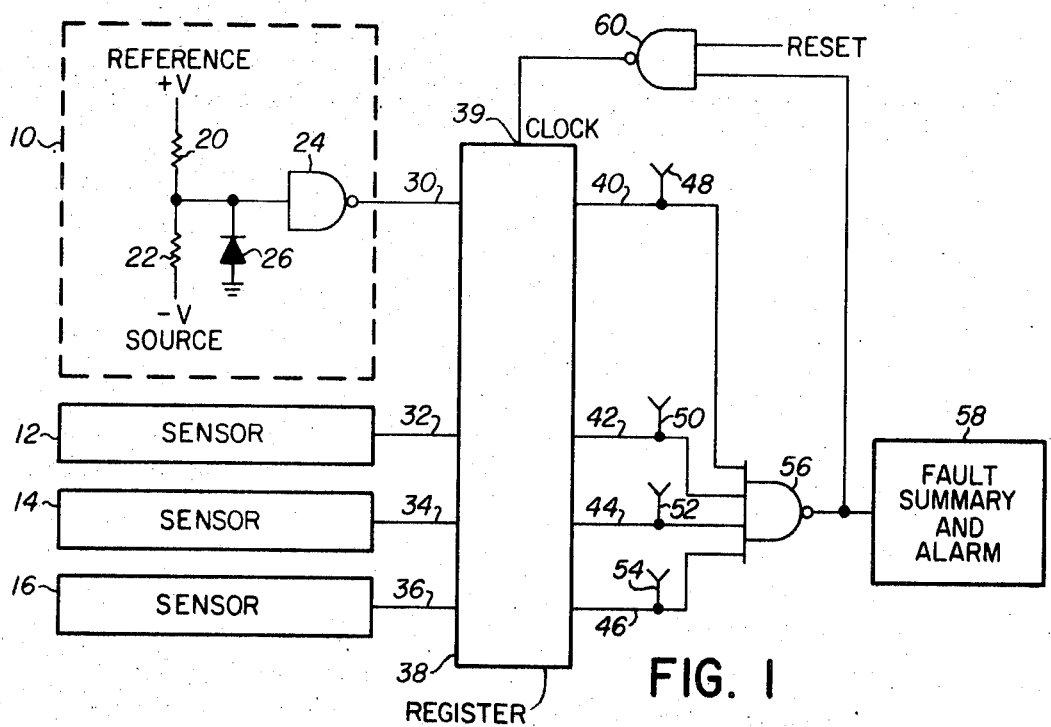
FIG. 1 is a schematic diagram of fault sensing and monitoring means in accordance with the invention.

Referring now to the drawings, FIG. 1 is a schematic diagram of one embodiment of sensing and monitoring equipment in accordance with the present invention. In this embodiment provision is made for monitoring four test points connected respectively through sensors 10, 12, 14, and 16. In accordance with one aspect of the invention, the sensors may comprise the circuit illustrated within block 10 and including a reference voltage +V and a monitored negative source voltage −V which are connected to voltage divider resistors 20 and 22. The common point of resistors 20 and 22 is connected to the input of inverter 24 with a diode 26 provided between the input and ground to limit the negative excursion of the input voltage. With sensor 10 the presence of the negative source voltage −V is monitored through proper selection of resistors 20 and 22 whereby a zero level input is applied to inverter 24 so long as the source voltage is present, thereby providing a "1" or positive voltage at the output of inverter 24. Removal of the source voltage forces the inverter output to become a "0" indicating a fault.

In one specific embodiment of the sensor, designed to monitor the presence of a −12 source voltage within an electrical system, the reference voltage is +5 volts, resistor 20 is 2.7 K ohms, and resistor 22 is 3.3 K ohms. Diode 26 is a 1N645 and inverter 24 is a standard flat pack SG-141 inverter.

Similarly, sensors 12, 14, and 16 are connected to respective points within the monitored electronic equipment, and so long as the proper voltage levels are detected, each monitor will provide a "1" or positive voltage to input terminals 30, 32, 34, and 36, respectively, of a storage register 38 which in this embodiment is a 4-bit storage register such as SM-71 produced by Sylvania. Storage register 38 functions in response to a clock input at terminal 39 whereby the inputs to the register are shifted through the register and to outputs 40, 42, 44, and 46, respectively, so long as the clock signal is positive. Test points 48, 50, 52, and 54, respectively, are provided to monitor individually each of the outputs 40–46.

The outputs of storage register 38 are connected to the inputs of NAND gate 56. So long as the proper voltage levels are being monitored, the inputs to NAND gate 56 are positive, thereby providing a "0" at the output of gate 56. The output of gate 56 is connected to a fault summary and alarm means 58 and to one input of NAND gate 60. The other input to gate 60 is a manually initiated reset. So long as the output of gate 56 is a "0" level, thereby indicating that all monitored voltages are present, the output of gate 60 is a "1" or positive level which is applied as the clock for storage register 38.

Should one or more of the monitored voltages vary from the acceptable norm, an input to register 38 is a "0" which is transmitted to an input to gate 56 thereby rendering the output of gate 56 positive. The positive output of gate 56 in combination with the normally positive voltage at the reset input terminal to gate 60 results in a "0" output at gate 60 which removes the clock from storage register 38 thereby storing or maintaining the present outputs on terminals 40, 42, 44, and 46. Thus, a repairman summoned by alarm 58 may at any time thereafter check the test points 48–54 to check which sensor had detected an unacceptable voltage level. This is particularly advantageous when the unacceptable condition being monitored is a transient effect or intermittent fault within the electrical system which would otherwise clear itself before maintenance personnel has a chance to identify the trouble spot.

Figure 2:
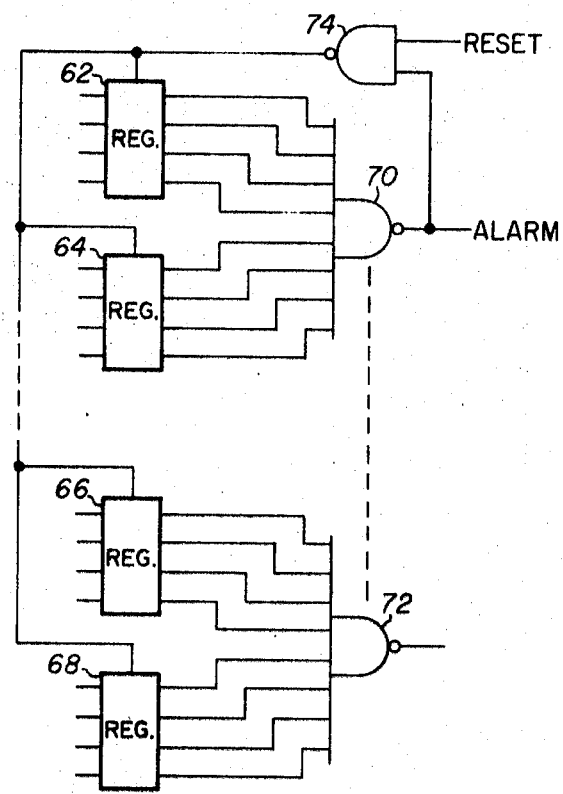
FIG. 2 is a schematic diagram illustrating an expanded sensing and monitoring apparatus in accordance with the present invention.

To monitor a greater number of voltages within an electronic system, a plurality of storage registers may be employed as illustrated in the schematic diagram of FIG. 2. In this embodiment, 16 voltages may be monitored by using four storage registers 62, 64, 66, and 68 in combination with one eight-input expandable NAND gate 70 and one eight-input NAND expander gate 72, with the outputs of registers 62 and 64 connected to gate 70 and the outputs of registers 66 and 68 connected to gate 72.

The output of gate 70 is tied to one input of NAND gate 74 with the other input to gate 74 being the reset line, similar to gate 60 in FIG. 1. Operation of the expanded monitoring means of FIG. 2 is similar to that of the monitoring means of FIG. 1 whereby any one fault generates a "0" signal which is transmitted through one of the storage registers to the NAND gates 70 or 72, whereupon the positive voltage generated by one of these gates is transmitted to gate 74 thereby changing the output of gate 74 to a "0" voltage level. The "0" voltage level is applied to the clock input of each of the storage registers thereby freezing the stored data within the register and allowing a serviceman to later identify the fault source.

Once the fault is identified and corrected, and all inputs to the storage registers are again "1" bits, the monitoring means is reset by momentarily toggling the reset input to gate 74 thereby restoring the "1" at the output of the gate. This reapplies the positive or "1" input to the clock terminal of each of the storage registers.

Figure 3:
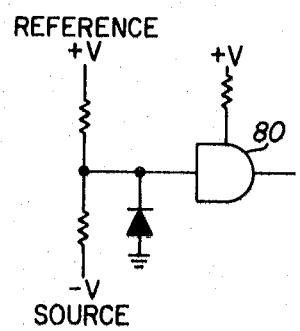
FIG. 3 is an alternate fault sensing circuit.

FIG. 3 is an alternative embodiment of a fault sensor similar to the sensor 10 of FIG. 1 but in which a Schmitt trigger 80 is used in place of the inverter 24. In all other respects the circuit remains the same. By so employing a Schmitt trigger an alarm generating "0" response may be generated in response to the monitored source voltage dropping below a precise predetermined level, as opposed to the fixed voltage level, which may vary widely with temperature, monitored with the inverter 24. Thus, the level of the monitored voltage may be more precisely adjusted by using a precision resistor divider to fire the Schmitt trigger at any desired level. Fault circuitry in accordance with the present invention has proved very successful in the servicing of large and complex electronic systems. While the invention has been described with reference to specific embodiments, the description is illustrative and is not to be construed as limiting the scope of the invention. Various changes and modifications may occur to those skilled in the art without departing from the spirit and scope of the invention as defined by the appended claims.

I claim:

1. Means for monitoring voltages and detecting faults within electronic equipment comprising a plurality of fault sensors, means for connecting the inputs of said sensors to monitor points within said equipment, storage register means, means connecting the outputs of said sensors to the inputs of said register means, first gate means, means connecting the outputs of said register means to the inputs of said first gate means, second gate means, means connecting the output of said first gate means to a first input to said second gate means, reset means connected to a second input to said second gate means, and means connecting the output of said second gate means to a clock input to said register means whereby a monitored fault locks said register means and actuates an alarm.

2. Monitor means as defined by claim 1 wherein said register means comprises a plurality of registers and said first gate means comprises a plurality of gates.

3. Monitor means as defined by claim 2 wherein said first and second gate means includes NAND gates.

4. Monitor means as defined by claim 1 wherein said fault sensors include at least one sensor comprising a voltage divider for connection between a reference voltage level and a monitored voltage, gate means, means connecting said voltage divider to the input to said gate means, and diode means connected between said input and a voltage level.

5. Monitor means as defined by claim 4 wherein said gate means is an inverter.

6. Monitor means as defined by claim 4 wherein said gate means is a Schmitt trigger circuit.

* * * * *